United States Patent [19]

Temple

[11] Patent Number: 5,778,221

[45] Date of Patent: Jul. 7, 1998

[54] SYSTEM FOR EXECUTING ASYNCHRONOUS BRANCH AND LINK IN PARALLEL PROCESSOR

[75] Inventor: Joseph L. Temple, Hurley, N.Y.

[73] Assignee: International Business Machines Corporation, Armonk, N.Y.

[21] Appl. No.: 818,862

[22] Filed: Mar. 17, 1997

[51] Int. Cl.$^6$ ............................................. G06F 9/46
[52] U.S. Cl. ............................................. 395/591; 395/377
[58] Field of Search ............................. 395/183.1, 183.11, 395/377, 591, 733, 734, 740, 800.1, 800.16, 800.18, 800.2, 800.21, 800.22

[56] References Cited

U.S. PATENT DOCUMENTS

| | | | |
|---|---|---|---|
| 4,112,490 | 9/1978 | Pohlman et al. | 395/287 |
| 4,276,595 | 6/1981 | Brereton et al. | 395/383 |
| 4,279,016 | 7/1981 | Leininger et al. | |
| 4,296,470 | 10/1981 | Fairchild et al. | |
| 4,410,939 | 10/1983 | Kawakami | 395/737 |
| 4,635,193 | 1/1987 | Moyer et al. | 395/183.1 |
| 4,719,565 | 1/1988 | Moller | 395/733 |
| 4,814,978 | 3/1989 | Dennis | 395/377 |
| 4,873,626 | 10/1989 | Gifford | |
| 4,891,787 | 1/1990 | Gifford | |
| 5,165,023 | 11/1992 | Gifford | |
| 5,418,970 | 5/1995 | Gifford | |
| 5,434,995 | 7/1995 | Oberlin et al. | |
| 5,463,732 | 10/1995 | Taylor et al. | |

OTHER PUBLICATIONS

IBM Technical Disclosure Bulletin, "Inter–Machine Request Interface for System Services", vol. 20, No. 1, Jun. 1977.

*Primary Examiner*—William M. Treat
*Attorney, Agent, or Firm*—DeLio & Peterson, LLC; Peter W. Peterson; Aziz M. Ahsan

[57] ABSTRACT

An interrupt system for use with an interruptable data processing system comprising a register for receiving and transmitting storage medium address data and branch and link instruction data, a selector circuit for receiving (i) instructions from a storage medium, (ii) the storage medium address data and (iii) the branch and link instruction data wherein the selector circuit has a first state for outputting data comprising instructions from the storage medium and a second state for outputting data comprising the storage medium address data and the branch and link instruction data. The interrupt system further comprising an instruction processor for processing data outputted by the selector circuit and outputting data for use by the processing system. The instruction processor outputting (i) storage medium address data and (ii) branch and link instruction data for input to the register and (iii) a user status signal when the selector circuit is in the first state and the selector circuit output comprises an asynchronous branch and link instruction. When the selector circuit is in the second state, the instruction processor processes the storage medium address data and the branch and link instruction data and outputs data defining a second program to which the processing system shall branch and the storage medium address at which the processing system shall resume operation according to the first program. The interrupt system further comprising a control circuit for configuring the selector circuit to the second state to transfer the branch and link instruction data to the instruction processor when the control circuit receives the user status signal and an interrupt signal.

9 Claims, 1 Drawing Sheet

SYSTEM FOR EXECUTING ASYNCHRONOUS BRANCH AND LINK IN PARALLEL PROCESSOR

BACKGROUND OF THE INVENTION

1. Field of the Invention

The present invention relates generally to the field of digital data processing systems, and more particularly to parallel processing systems.

2. Problem to be Solved

In parallel processing computers, such as multiple-instruction-multiple-data-stream (MIMD) processors or multiple-processor-multiple-data (MPMD) processors, there are typically two types of operational threads: (i) a compute thread, and (ii) a communication thread. The compute thread constitutes normal system programming dedicated to computations and processing of data. The communication thread constitutes the processing of communication data or message traffic. The communication thread is implemented with a program that is different than the program used in normal programming. The communication thread is typically implemented (or "triggered") upon occurrence of an external event and therefore is an externally triggered thread. When communication data is to be processed, normal programming is temporarily halted to allow branching to the program that effects processing of the communications data.

One conventional technique for branching to the program that effects processing of communication data is a system interrupt with context switches. System interrupts typically utilize a context switch which causes the exchange or swapping or the states of the status words of the program or routine currently being executed and the program or routine that needs to be executed. The state of the status word of the program being executed at the time of the interrupt is stored. A significant disadvantage of an interrupt with a context switch is the considerable number of overhead cycles needed to safely suspend the operation of the current program and start a new one in a different memory space and operating environment. Thus, context switching significantly increases system overhead and costs.

Another conventional technique for branching to the program that implements communication data processing is polling. Polling is the periodic monitoring of a communication data bus for the presence of communication data. Specifically, polling causes periodic branching to and from the program that effects communication data processing. Branching to this routine occurs even if no communication data is present. Each time a "poll" is taken, normal programming is interrupted. Thus, each "poll" consumes time that could be spent in the normal programming mode. Although polling requires relatively less hardware and has relatively less overhead than the interrupt and context switch technique, polling decreases the efficiency of the parallel processor.

What is needed is a way for a parallel processor system to efficiently process communication data with overhead that is lower than the conventional methods.

Therefore, it is an object of the present invention to provide a digital data system for use in a parallel processor system that allows the parallel processor to efficiently processes communication data as soon as the data is available.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, an interrupt system for enabling an interruptable data processing system to operate according to a first program, branch to a second program when the processing system is interrupted, and then return to the first program, the interrupt system comprising:

- a storage medium for storing instructions, the storage medium including a plurality of addressable storage locations, each identified by an address;

- a branch and link instruction register for receiving and transmitting storage medium address data and branch and link instruction data;

- a selector circuit for receiving (i) instructions from the storage medium, (ii) the storage medium address data and (iii) the branch and link instruction data, the selector circuit having a first state wherein the selector circuit outputs data comprising instructions from the storage medium and a second state wherein the selector circuit outputs data comprising the storage medium address data and the branch and link instruction data;

- an instruction processor for processing data outputted by the selector circuit and outputting data for use by the interruptable digital data processing system, the instruction processor outputting (i) storage medium address data and (ii) branch and link instruction data for input into the branch and link register and (iii) a user status signal when the selector circuit is in the first state and the selector circuit output comprises an asynchronous branch and link instruction, when the selector circuit is in the second state, the instruction processor processing the storage medium address data and the branch and link instruction data and outputting data defining the second program to which the interruptable digital data processing system shall branch and the storage medium address at which the interruptable digital data processing system shall resume operation according to the first program;

- a control circuit responsive to the status signal and an interrupt signal, the control circuit configuring the selector circuit to the second state to transfer the branch and link instruction data to the instruction processor when the control circuit receives the user status signal and the interrupt signal.

BRIEF DESCRIPTION OF THE DRAWING

The features of the invention are believed to be novel and the elements characteristic of the invention are set forth with particularity in the appended claims. The figure is for illustration purposes only and is not drawn to scale. The invention itself, however, both as to organization and method of operation, may best be understood by reference to the detailed description which follows taken in conjunction with the accompanying drawing in which:

DESCRIPTION OF THE PREFERRED EMBODIMENTS

Figure 1:
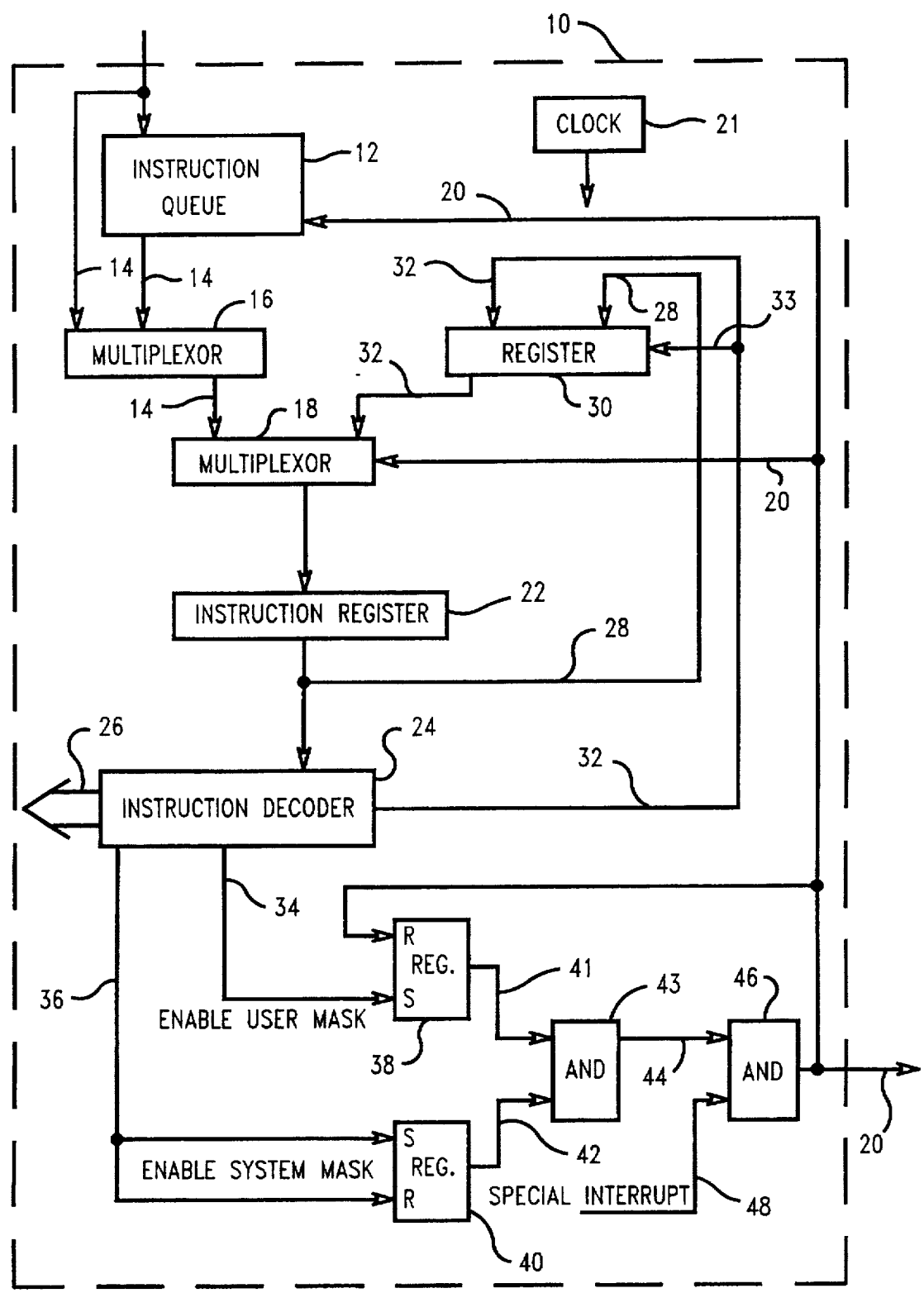
FIG. 1 is a schematic diagram of the parallel processor of the present invention.

In describing the preferred embodiment of the present invention, reference will be made herein to FIG. 1 of the drawing in which like numerals refer to like features of the invention.

In describing digital data processing system 10 of the present invention, the various signals described below are bi-state signals having either a logic "1" state when enabled or a logic "0" state when disabled. It is to be understood that these are preferred configurations and that system 10 may be configured such that signals may have a logic "1" state when disabled or a logic "0" state when enabled. Furthermore, any type of logic may be used, e.g. TTL, ECL or CMOS.

Referring to FIG. 1, digital data processing system 10 of the present invention includes instruction queue or buffer 12 that receives and stores instructions 14 from a memory device (not shown). Instructions 14 are outputted in the same order in which they were inputted. This is also referred to as FIFO (first in, first out). Instructions 14 are inputted into multiplexor or selector 16. Instructions 14 may also be loaded into multiplexor 16 directly from the memory. Multiplexor 16 is enabled to pass instructions 14 to multiplexor 18. Multiplexor 18 receives signal 20 which has first and second states. When signal 18 has the first state, it is a logic "1" or logic "high". When signal 18 has the second state, it is a logic "0" or logic "low". Multiplexor 18 passes the instructions 14 to instruction register 22 when signal 18 has the logic "high" state. The generation of signal 20 is discussed below in detail. It is to be understood that queue 12, multiplexors 16 and 18 and the devices discussed below function in accordance with system clock 21.

Among the instructions stored in queue 12 is at least one instruction referred to herein as an Asynchronous Branch And Link ("ABAL") instruction. The ABAL instruction, like all other instructions, passes through multiplexors 16 and 18 and is inputted into instruction register 22. Instruction register 22 outputs the ABAL instruction, upon receiving a clock pulse from system clock 21, for input to instruction decoder 24. Instruction register 22 also outputs multi-bit signal 28 for input into register 30. Signal 28 contains register pointer fields of the link register and source register to be used upon subsequent execution of a Branch and Link Instruction ("BAL") instruction stored in register 30. The address of this instruction is also referred to as the "link" address. The significance of the "link" address is discussed in greater detail below. When instruction 14 is decoded, instruction decoder 24 outputs multi-bit signal 32 that is the operational code that defines the BAL instruction. BAL instruction 32 is loaded into register 30. Signal 33 is a single-bit signal that is derived from BAL instruction 32 and enables register 30 to receive multi-bit signal 28 and BAL instruction 32. The concept of "branching" and "linking" is described in commonly owned U.S. Pat. No. 4,279,016, the disclosure of which is incorporated herein by reference.

The source register to which the BAL instruction points contains the address of the program segment to which the parallel processor must branch to accomplish another task such as processing communication data or message traffic. The link register to which the BAL instruction points holds or stores the address at which the original program resumes operation upon completion of processing communication data or message traffic.

Instruction decoder 24 also outputs single-bit signals 34 and 36. Signal 34 is referred to as the USER MASK signal and has first and second states. When signal 34 has the first state, it is enabled and is a logic "1" or logic "high". When signal 34 has the second state, it is disabled and is a logic "0" or logic "low". Normally, signal 34 has logic "0" state. When decoder 24 decodes an ABAL instruction, USER MASK signal 34 shifts to a logic "1" state. USER MASK signal 34 is inputted into the SET input of latch 38. The purpose of this configuration is described in detail below.

Signal 36 is referred to as a SYSTEM MASK signal and has first and second states. When signal 36 has the first state, it is enabled and is a logic "1" or logic "high". When signal 36 has the second state, it is disabled and is a logic "0" or logic "low". Signal 36 defines the status word of the state of the main program being executed by system 10. Thus, the state of signal 36 depends upon whether system 10 is allowed to implement an Asynchronous Branch And Link process. Decoder 24 is programmed to enable SYSTEM MASK signal 36 to a logic "1" level to indicate that the parallel processor with which system 10 is used is capable of executing Asynchronous Branch And Link instructions. SYSTEM MASK signal 36 is inputted into both the SET and RESET inputs of latch 40. SYSTEM MASK signal 36 sets or resets the system mask based on execution of a control instruction which enables or disables the whole Asynchronous Branch and Link process. The masks and register 30 become part of the program state and are saved on context switches. Saving the contents of register 30 can be made conditional on the state of the masks.

Latches 38 and 40 output signals 41 and 42, respectively, for input into AND gate 43. AND gate 43 outputs signal 44 for input into AND gate 46. Since USER MASK signal 34 is enabled when decoder 24 decodes an ABAL instruction and SYSTEM MASK is also enabled, signal 44 has a logic "1" state.

Signal 48 is a SPECIAL INTERRUPT signal and has first and second states. When signal 48 has the first state, it is disabled and is a logic "0" or logic "low". When signal 48 has the second state, it is enabled and is a logic "1" or logic "high". A timing signal or a combination of a timing signal and a "data ready" signal can be used to trigger SPECIAL INTERRUPT signal 48. When communication data is available on a data bus (not shown) and must be processed, SPECIAL INTERRUPT signal 48 is enabled and has a logic "1" state thereby causing AND gate 46 to output signal 20 having a logic "1" state. Processing of the communication data takes place in other parts of the parallel processor system that utilizes system 10. Until SPECIAL INTERRUPT signal 48 is enabled, system 10 continues to execute instructions 14 in a normal fashion.

When SPECIAL INTERRUPT signal 48 has a logic "1" level, signal 20 is a logic "1" and controls multiplexor 18 to pass BAL instruction 32, outputted from register 30, to instruction register 22 instead of the next normal one of instructions 14 gated by multiplexor 16. On the next clock pulse, instruction register 22 outputs BAL instruction 32 to instruction decoder 24. Decoder 24 decodes BAL instruction 32 which, as described above, comprises digital data that defines: (i) the program to which the parallel process shall branch, and (ii) the queue address to which the parallel processor shall link when all communication data (or message traffic) is processed and normal system program execution is to resume.

Signal 20 also is inputted into the RESET input of latch 38. When signal 20 shifts to a logic "1" state, latch 38 is reset so as to reset USER MASK signal 34. Resetting USER MASK signal 34 ensures that the system programming will not halt and branch to another program unless another ABAL instruction has been downloaded from queue 12.

Signal 20 is also used to inhibit an instruction counter (not shown) when SPECIAL INTERRUPT signal 48 is enabled. During normal operation, the instruction counter is updated or incremented every time a normal instruction is executed. The counter then points to the next normal instruction in queue 12. Since a BAL instruction is not a normal instruction, signal 20 prevents this counter from being updated. Thus, when the system interrupt period is complete, the parallel processor using system 10 resumes executing instructions in queue 12 but starts at the queue address defined by the LINK data in the BAL instruction and register fields 28. Such a configuration assures resumption of normal program execution at the correct queue address thus preventing instructions from being skipped over.

THEORY OF OPERATION

When system 10 operates in a normal mode of operation, such as a computation mode, instructions 14 are sequentially downloaded from queue 12. During the normal mode of operation, multiplexors 16 and 18 are configured to pass instructions 14 to instruction register 22. On the next clock pulse, instructions 14 are outputted from instruction register 22 and are inputted into instruction decoder 24. Instruction decoder 24 decodes instruction 14 and then outputs appropriate signals on data bus 26. Data bus 26 transfers signals to various portions of the parallel processing system that utilizes system 10.

Queue 12 contains, in addition to normal instructions, at least one ABAL instruction. When the ABAL instruction is downloaded from instruction queue 12, it passes through multiplexors 16 and 18 and into instruction register 22. On the next clock pulse, the ABAL instruction passes to instruction decoder 24. In response to the ABAL instruction, instruction decoder 24: (i) outputs the BAL instruction or operation code 32 for input into register 30, and (ii) sets USER MASK signal 34 to a logic "1" level. As described above, the BAL instruction code 32 also effects transfer of the register fields 28 to register 30. This is accomplished by signal 33. For the reasons discussed above, SYSTEM MASK signal 36 is already set to a logic "1" level.

System 10 continues to process instructions 14 from queue 12 in a normal fashion until SPECIAL INTERRUPT signal 48 is enabled. When this occurs, signal 20 switches to a logic "1" level and controls multiplexor 18 to receive and pass the BAL instruction outputted from register 30. Signal 20 also inhibits the instruction update counter as discussed above. BAL instruction 32 is then passed through instruction register 22 and into instruction decoder 24. Decoder 24 determines the program to which the parallel processor using system 10 shall branch. Decoder 24 outputs signals over bus 26 to effect branching to the appropriate program. A logic "1" signal 20 also resets latch 38 so as to shift signal 41 to a logic "0" level.

Signal 20 is enabled or logic "1" only for one cycle since it resets the mask. As a result, multiplexor 18 gates the contents of register 30 into instruction register 22 only once. When SPECIAL INTERRUPT signal 48 switches to a logic "0" level, signifying the end of the interrupt period, signal 20 switches to a logic "0" level thereby configuring multiplexor 18 to pass instructions 14 to instruction register 22. The normal mode of operation resumes with the instruction in queue 12 having a queue address defined by the "LINK" portion of the BAL operation code 32 and register fields 28. The switching of the logic state of SPECIAL INTERRUPT signal 48 to a logic "0" state also causes decoder 24 to reset USER MASK signal to a logic "0" state. Therefore, a branch and link process cannot be executed again unless a new ABAL instruction is downloaded from instruction queue 12.

Thus, digital data system 10 of the present invention provides the following advantages:

a) system 10 allows parallel processor systems to process communication data as it becomes available;

b) parallel processor systems using system 10 are relatively more efficient than conventional parallel processor systems that use polling or interrupts with context switches; and c) system 10 enhances the granularity of parallelism of parallel processor systems.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An interrupt system for enabling an interruptable data processing system to operate according to a first program, branch to a second program when the processing system is interrupted, and then return to the first program, the interrupt system comprising:

a storage medium for storing instructions, the storage medium including a plurality of addressable storage locations, each identified by an address;

a branch and link instruction register for receiving and transmitting storage medium address data and branch and link instruction data;

a selector circuit for receiving (i) instructions from the storage medium, (ii) the storage medium address data and (iii) the branch and link instruction data, the selector circuit having a first state wherein the selector circuit outputs data comprising instructions from the storage medium and a second state wherein the selector circuit outputs data comprising the storage medium data and the branch and link instruction data;

an instruction processor for processing data outputted by the selector circuit and outputting data for use by the interruptable digital data processing system, the instruction processor outputting (i) storage medium address data and (ii) the branch and link instruction data for input into the branch and link register and (iii) a user status signal when the selector circuit is in the first state and the selector circuit output comprises an asynchronous branch and link instruction, when the selector circuit is in the second state, the instruction processor processing the storage medium address data and the branch and link instruction data and outputting data defining the second program to which the interruptable digital data processing system shall branch and the storage medium address at which the interruptable digital data processing system shall resume operation according to the first program; and a control circuit responsive to the status signal and an interrupt signal, the control circuit configuring the selector circuit to the second state to transfer the branch and link instruction data to the instruction processor when the control circuit receives the user status signal and the interrupt signal.

2. The interrupt system according to claim 1 wherein the storage medium comprises an instruction queue.

3. The interrupt system according to claim 1 wherein the selector circuit comprises a multiplexor having a first input for receiving instructions from the storage medium, a second input for receiving branch and link instruction data and storage medium address data from the branch and link register, and a third input for receiving a control signal, the control signal having a first state that configures the selector in the first state and a second state that configures the selector circuit in the second state.

4. The interrupt system according to claim 1 wherein the instruction processor comprises:

an instruction register for receiving the data outputted from the selector circuit, the selector circuit outputting data comprising the storage medium address data which defines register fields for input into the branch and link register when the data outputted by the selector circuit comprises an asynchronous branch and link instruction; and an instruction decoder for receiving the data outputted by the instruction register and outputting (i) branch and link instruction data for input to the branch and link register and (ii) a user status signal when the selector circuit has the first state and the storage medium instruction comprises an asynchronous branch and link instruction, when the selector circuit is in the second state, the instruction processor processing the storage medium address data and the branch and link instruction data and outputting data defining the second program to which the interruptable digital data processing system shall branch and the storage medium address at which the interruptable digital data processing system shall resume operation according to the first program.

5. The interrupt system according to claim 3 wherein the user status signal has a normal first state and a second state, the user status signal changing to the second state when the instruction processor processes the asynchronous branch and link instruction, the control circuit outputting the control signal with the second state when the user status signal has the second state and the control circuit receives the interrupt signal.

6. The interrupt system according to claim 5 wherein the instruction decoder further outputs a system status signal having first and second states, the control circuit outputs the control signal with the second state when the user and system status signals have the second state and the control circuit receives the interrupt signal.

7. The interrupt system according to claim 1 wherein the interrupt signal has first and second states, the control circuit comprising:

a first logic circuit for outputting an enabling interrupt signal when the user mask signal has a second state and the control signal has the first state, the first logic circuit outputting a disabling interrupt signal when the control signal has the second state; and a second logic circuit for outputting the control signal with the first state when the first logic circuit outputs the disabling interrupt signal or when the interrupt signal has a first state, the second logic circuit outputting the control signal with a second state when the first logic circuit outputs the enabling interrupt circuit and the interrupt signal has the second state.

8. The interrupt system according to claim 7 wherein the instruction decoder further outputs a system status signal having a first state indicating the interrupt system is not permitted to execute the asynchronous branch and link instruction and a second state indicating the interrupt system is permitted to execute the asynchronous brand and link instruction.

9. The interrupt system according to claim 8 wherein the second logic circuit is respective to the system status signal, the second logic circuit outputting the control signal with the first state when the system status signal has the first state and outputting the control signal with the second state when the first logic circuit outputs the enabling interrupt signal and the system status and interrupt signals have the second state.

* * * * *

UNITED STATES PATENT AND TRADEMARK OFFICE
CERTIFICATE OF CORRECTION

PATENT NO. : 5,778,221
DATED : July 7, 1998
INVENTOR(S) : Joseph L. Temple

It is certified that error appears in the above-identified patent and that said Letters Patent is hereby corrected as shown below:

In claim 8, line 24, delete "brand" and substitute therefore - - branch - -.

Signed and Sealed this

Twenty-fourth Day of November, 1998

Attest:

BRUCE LEHMAN

Attesting Officer

Commissioner of Patents and Trademarks